July 22, 1952 J. A. CUPLER, II 2,603,986
MACHINE TOOL
Filed March 18, 1948 2 SHEETS—SHEET 1
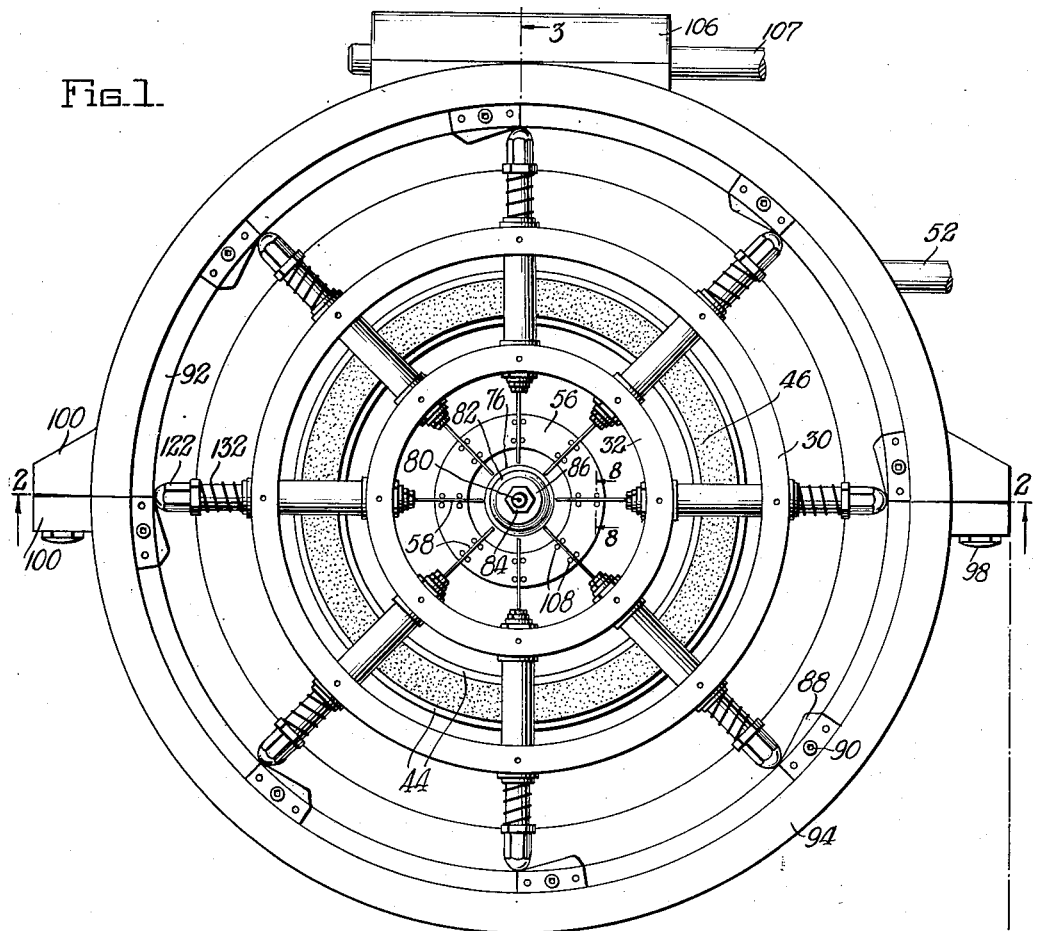
Fig. 1.
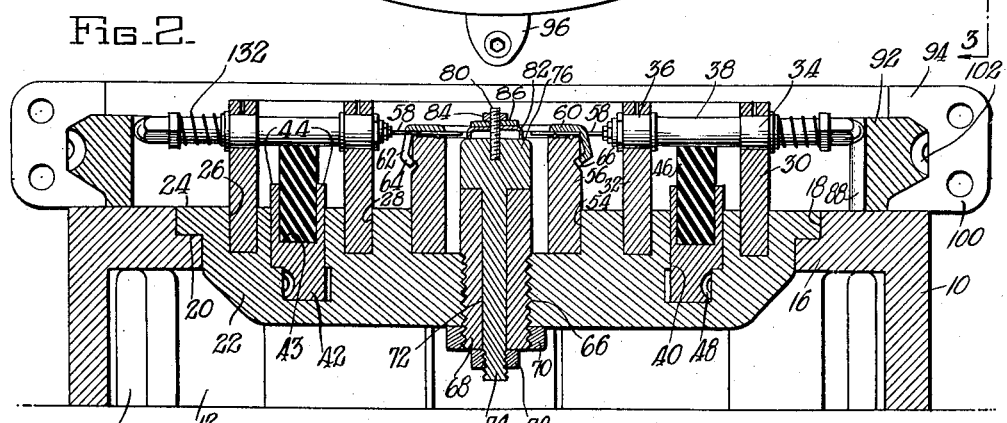
Fig. 2.
Fig. 3.
INVENTOR.
JOHN A CUPLER, II
BY
Raymond Whotkw
ATTORNEY July 22, 1952 J. A. CUPLER, II 2,603,986
MACHINE TOOL
Filed March 18, 1948 2 SHEETS—SHEET 2
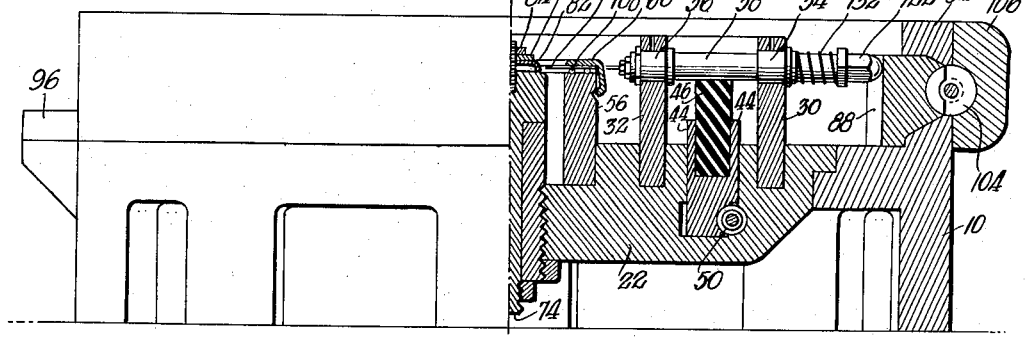
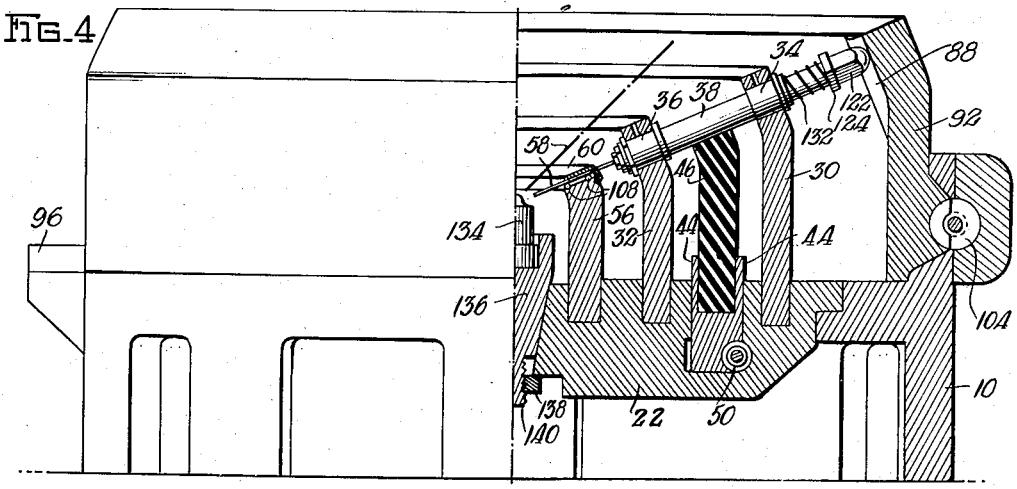
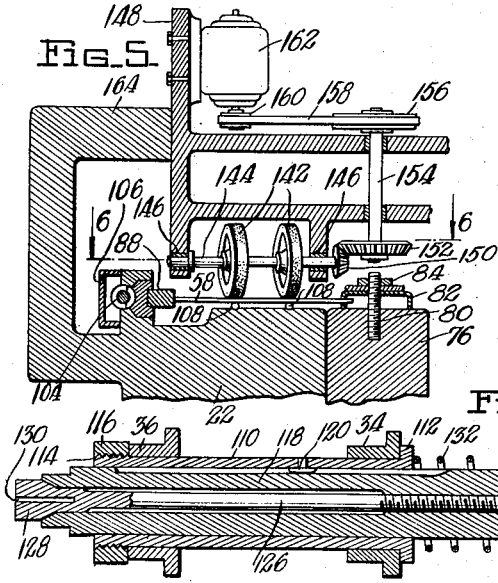
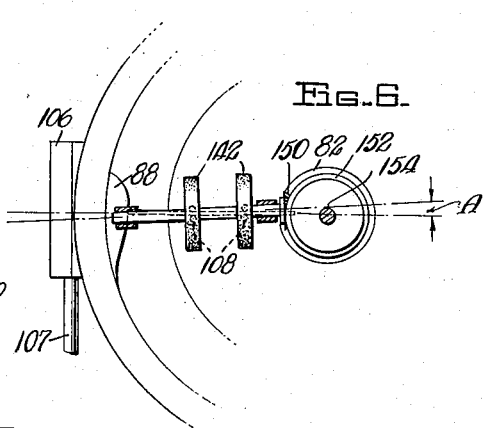
INVENTOR.
JOHN A. CUPLER, II
BY
Raymond W. Wooster
ATTORNEY Patented July 22, 1952

2,603,986

UNITED STATES PATENT OFFICE 2,603,986

MACHINE TOOL

John A. Cupler, II, Cumberland, Md.

Application March 18, 1948, Serial No. 15,570

22 Claims. (Cl. 77—26)

The problem of maintaining a tool on a predetermined axis with respect to a workpiece has been a perennial one with most machine tools, and has accounted in part for the size and weight imparted to such tools in the efforts to achieve rigidity. While some of the expedients employed in this connection have produced reasonably satisfactory results where the tools themselves are relatively rigid, inherently flexible tools have never been successfully utilized in automatic or semi-automatic machinery where close tolerances are required.

In drilling, tapping, punching, reaming, and various other operations, particularly where the tool has a sufficiently small perimeter to adapt it for use in the production of balance wheels for watches, diesel nozzles, parts for hypodermic and suture needles, and many other scientific and commercial products and parts, there is more frequently than not a tendency for the tool to yield and become misaligned, both before and after engaging the work, with the result that the operation is inaccurately performed and the tool often rendered useless for further operations. And this effect becomes more prevalent with increasing ratios of the unsupported length of a tool with respect to its perimeter or diameter. Nor is this condition necessarily overcome even where the tools themselves are highly accurate, since it is not uncommon for the tip of a small drill to be deflected from its original axis by an amount exceeding its diameter. In drilling, reaming, punching and/or tapping openings of the magnitude of .001 to .010 inch diameter, as has been common practice for the present inventor for many years, it has been customary to perform only one operation at a time, even where the precise operation must be repeated at spaced portions of the same work piece, as in drilling a balance wheel or diesel nozzle, for example. Now that the present inventor has discovered how to maintain a tool of any practical size in its axial position during an operation, it becomes possible not only to achieve a higher degree of accuracy during a single operation, but to maintain such accuracy while simultaneously performing multiple operations upon a work piece.

The present invention contemplates a machine tool comprising a frame, a work support carried by the frame, means supported by the frame for advancing a tool towards the work support, and tool engaging means relatively fixed with respect to the frame intermediate the work support and advancing means for maintaining the work engaging portion of the tool in axial alignment.

The tool engaging means may provide a notch formation, and may be secured to the frame so as to define a plurality of aligned notches. Such a notch formation may be defined by spherical elements arranged in spaced pairs, and the elements composed of synthetic sapphire for example. The engagement of the tool to maintain its alignment is preferably provided at three peripheral points thereof, substantially in a single plane perpendicular to the tool axis. A tool support may assume the form of a rotary spindle and peripheral driving means may be applied directly to the tool or to such a spindle, and such driving means may be yieldable in nature as would be characteristic of a roller presenting a surface of rubber or similar material.

The advancing means for the tool may include a cam surface, and where progressively increasing reciprocatory advancement of the tool is desired, such a surface will be stepped or contoured accordingly. It is contemplated that each tool be normally biased away from the work support, and where a plurality of tools are employed, a corresponding number of tool engaging means may be provided adjacent the work support in a radial fashion. Under these conditions the several tools may be advanced simultaneously and receive rotary motion from a peripheral driving means engaging the tools themselves or their spindles. By providing spaced, aligned notches for receiving each tool and engaging each tool at three peripheral points in each of two spaced planes, between the work piece and tool advancing means, it will be clear that movement of the work engaging portions of the tools will be axial in nature. The tool axes can be assigned any desired angle with respect to a work piece and the driving means may serve to bias the tools away from the work piece to maintain their contact with the advancing means.

A more complete understanding of the invention will be afforded by a description of the examples depicted in the accompanying drawings, wherein:

Fig. 1 is a plan view illustrating one contemplated form of the present invention;

Fig. 2 is a sectional elevation taken along line 2—2 of Fig. 1;

Fig. 3 is an elevation partially in section taken along line 3—3 of Fig. 1;

Fig. 4 is an elevation partially in section, of a modified form of the invention;

Fig. 5 is a somewhat schematic and fragmentary sectional elevation of a modified form of the invention;

Fig. 6 is a plan view taken along lines 6—6 of Fig. 5;

Fig. 7 is a detail in sectional elevation of a suitable spindle of the type represented in Figs. 1 to 4 inclusive; and Fig. 8 is a fragmentary detail on an enlarged scale taken along line 8—8 of Fig. 1.

With particular reference to Figs. 1 to 3 inclusive, the apparatus comprises a base 10 having a discontinuous skirt forming legs 12 spaced by radial openings 14. The base is provided with a horizontal flange 16 containing a counterbore 18 to define a seat 20 for its table 22. The upper surface 24 of the table is formed with concentric grooves 26 and 28 for the reception of annuli 30 and 32 respectively whose upper ends receive the bushings 34 and 36 of the spindles 38, best shown in Figs. 2 and 3. Intermediate the annular grooves 26 and 28 of the table there is formed an annular groove 40 for the reception of a driving ring 42, the upper portion of which contains an annular groove 43 defining walls 44 between which is seated a resilient ring 46 of natural or synthetic rubber, for example, whose exposed radial surface frictionally engages the periphery of each spindle 38 to impart rotation thereto. The outer periphery of the lower portion of the driving ring 42 is formed with teeth 48 defining a worm wheel, through which it is rotated by engagement with a complementary worm 50 secured to a shaft 52 projecting beyond the frame to be coupled with a suitable motor or other driving means, not shown.

The upper surface 24 of the table is provided with a central counterbore 54 in which is secured an annular tool support 56, on whose upper radial surface a plurality of radially disposed bights are provided for peripheral engagement with the shanks of the tools 58 which are carried by the spindles 38. In order to maintain such tools seated in their bights, a snap ring 60 biases the tools into these bights, the snap ring having resilient depending legs 62 terminating in inclined fingers 64 which project into one or more inclined notches 66 formed in the periphery of the tool supporting ring 56, serving to urge the ring downwardly to bear upon the tool peripheries. The table is provided with a central threaded opening 66 for the reception of a similarly threaded post or bushing 68 whose projecting lower end receives a lock nut 70, and whose central bore 72 receives a shank 74 depending from a head 76 defining a work support. The lower end of the shank 74 is threaded to receive a lock nut 78 while the upper surface of the work supporting head 76 is drilled and tapped to receive a threaded post 80 for securing the member which it is desired to process, such as the work 82, in its required position by means of a nut 84 bearing upon a washer 86.

Reciprocatory movement is imparted to the tools by means of cams 88 removably secured by set screws 90 in a cam ring 92 which operates in a split housing 94, suitably secured to the base 10 by means of lugs 96. The sections of the housing 94 are assembled by means of bolts 98 which secure together their radially projecting ears 100. The outer periphery of the cam ring 92 carries teeth 102 for engagement with a worm 104 operating in a casing 106 from which the worm shaft 107 projects for connection with a suitable driving motor or other source of power.

The bights for assuring alignment of the free ends of the tools are depicted as defined by two spaced pairs of balls 108 for each tool employed.

For purposes of clarity, the snap ring 60 has been omitted in Fig. 1 of the drawing in order that the arrangement of these balls can be shown. The balls or spherical surfaces which may be formed from synthetic sapphire for example, are rigidly secured to the upper surface of the tool supporting ring 56 so that their bights are radial with respect to the center of the work secured to the work support. In view of the spherical formation, tools having cylindrical shanks of various sizes will enjoy a plurality of point contacts and thus assure the movement of the tool during an operation as being axial with respect to the tool itself and thus independent of any eccentricities which might occur in the spindles, their bushings or any other parts of the apparatus, whether the tool be merely rotated, merely reciprocated or both. The section depicted in Fig. 8 illustrates the manner in which the tool shank is received in the bight defined by one pair of balls or spherical surfaces, it being understood that portions of a sphere will serve the purpose as well as a complete sphere, and the function of the snap ring 60 bearing upon the upper portion of the periphery of the tool shank serves to bias the same into the bights defined by the spaced pairs of spherical guides.

A suitable spindle shown on an enlarged scale in Fig. 7 as received in its bushings 34 and 36, comprises an outer sleeve 110 having a flanged end 112 and a threaded end 114, the flanged end bearing against the bushing 34 and the threaded end receiving a nut 116 to secure the spindle assembly in its supports. An inner sleeve member 118 is secured by a spline or key 120 for rotation with the sleeve 110 and for reciprocation with respect thereto. One end of the member is threaded to receive a cam follower 122 adjustable with respect thereto and secured in any desired adjusted position by means of a lock nut 124. The member 118 is also internally threaded at this end to receive the threaded shank 126 of a collet 128 projecting from the other end of the member where it provides a socket 130 for reception of the tool. In accordance with existing practice, complementary inclined portions on the collet and the inner sleeve member will cause the jaws of the collet to contract when the threads of the shank 126 are advanced, and similarly permit expansion of the jaws to release the tool when the threads are retracted.

Assuming that power has been applied to the worm shafts and the parts have been assembled and adjusted in the manner depicted in Fig. 2, it will be clear that the spindles and the tools will be rotated by the frictional engagement of the resilient ring 46 with the spindle peripheries and as the followers 122 are depressed by the inclined surfaces of the cams 88 during the rotation of the cam ring 92, the tools will be reciprocated to perform their operations upon the work, which in the case of Fig. 2 assumes the form of a balance wheel or the like. When the cams have passed beyond the followers, the tools are retracted from the work by means of springs 132 interposed between the flanged ends 112 of the sleeves 110 and the lock nuts 124 for the followers. It will be understood that the cam surfaces may receive any desired contour for rapid or slow penetration of the work or for progressively increased penetration in a reciprocating manner in accordance with known methods of drilling. It will be understood that the operation of the apparatus is by no means confined to drilling, but is definitely contemplated for tapping, punching, reaming and other operations for which a machine tool of this type is adapted. As previously mentioned, the tools may be rotated without reciprocation, reciprocated without rotation, or reciprocated and rotated simultaneously.

The elevation of the work can be modified by adjusting the sleeve 68; and rotated by adjusting the shank 74. The penetration of the tools can be varied not only by substituting cams of various configurations, but by adjusting the position of the follower 122 on the threaded end of the inner sleeve member 118.

The apparatus depicted in Fig. 4 is quite analogous to that described with reference to the preceding figures, differing primarily in the provision for inclined drilling where the tool is angularly displaced with respect to a horizontal plane. Such a relationship may be desirable where the work is a diesel nozzle 134 for example shown as received in a somewhat modified work support 136 secured to the table 24 by means of a nut 138 applied to the lower threaded end 140 of the work support. To accomplish this result, the upper portions of the cam ring 92, the spindle supports 30 and 32, the resilient ring 46 and the tool support 56 are inclined so that the tool will reciprocate along an axis making the required angle with a horizontal plane.

In the modification depicted in Figs. 5 and 6, the tool 58 requires no driving spindle, being rotated directly in the bights defined by the spaced pairs of spherical surfaces 108 by similarly spaced friction rollers 142 carried by a shaft 144 in bearings 146 at an angle slightly displaced with respect to the radius of the work 82. By virtue of the displacement to the extent of this slight angle A, rotation of the rollers in bearing relationship with the shank of the tool will serve not only to rotate the tool in contact in the bights receiving it, but to impart an axial component whereby the tool will be biased against its cam 88 carried by the cam wheel 92. The rollers 142 and their shaft 144 are supported in a frame 148 which may be raised and lowered with respect to the table 22 and the work mounted on its support 76 in order to insert and remove the work pieces. The inner end of the shaft 144 carries a bevel gear 150 in mesh with a larger bevel gear 152 carried by a shaft 154, whose upper end receives a pulley 156 driven by a belt 158 from a pulley 160 carried by the shaft of a motor 162, all supported by the frame 148. The means for elevating and lowering the frame 148 has not been depicted, but a guide 164 secured to the table has been somewhat diagrammatically represented for determining the path of movement of the frame and its operating parts.

It will be understood that any desired number of tools can be utilized with this apparatus, limited only by the physical size of the operating elements and the work itself. Accordingly, in the modification of Figs. 5 and 6, as in the other forms illustrated, it is contemplated that a plurality of bevel gears 150 be provided in mesh with the central bevel gear 152 for simultaneously plurally drilling, tapping or reaming the work piece 82.

The bights or notches described thus far as defined by spaced pairs of spherical elements, can be provided in some cases by V-blocks or other arrangements which will serve to maintain the alignment of the tool axis in operation.

Whereas the structural form of the present invention has been described with reference to a very limited number of modifications, many alternative arrangements based upon this novel concept will occur to those skilled in the art as they have been recognized already by the present inventor, and accordingly, the scope of this invention should not be limited beyond the terms of the appended claims.

I claim:

1. A machine tool comprising a frame, a work support carried by said frame, means supported by said frame for advancing a tool towards said work support, tool engaging means comprising spaced pairs of contacts relatively fixed with respect to said work support intermediate said work support and said advancing means for maintaining the work engaging portion of said tool in axial alignment, and yieldable resilient tool biasing means opposed to said engaging means for maintaining the tool periphery in contact with said engaging means.

2. A machine tool comprising a frame, a work support carried by said frame, means supported by said frame for advancing a tool towards said work support, notch-forming tool engaging means comprising spaced pairs of contacts relatively fixed with respect to said frame intermediate said work support and said advancing means for maintaining the work engaging portion of said tool in axial alignment, and yieldable resilient tool biasing means opposed to said engaging means for maintaining the tool periphery in contact with said engaging means.

3. A machine tool comprising a frame, a work support carried by said frame, means supported by said frame for advancing a tool towards said work support, tool engaging means comprising spaced pairs of contacts secured to said frame defining a plurality of aligned notches intermediate said work support and said advancing means for maintaining the work engaging portion of said tool in axial alignment, and yieldable resilient tool biasing means opposed to said engaging means for maintaining the tool periphery in contact with said engaging means.

4. A machine tool comprising a frame, a work support carried by said frame, means supported by said frame for advancing a tool towards said work support, spaced pairs of spherical tool engaging means relatively fixed with respect to said frame intermediate said work support and said advancing means for maintaining the work engaging portion of said tool in axial alignment, and yieldable resilient tool biasing means opposed to said engaging means for maintaining the tool periphery in contact with said engaging means.

5. A machine tool comprising a frame, a work support carried by said frame, means supported by said frame for advancing a tool towards said work support, tool engaging means comprising spaced pairs of contacts relatively fixed with respect to said frame intermediate said work support and said advancing means for maintaining the work engaging portion of said tool in axial alignment, said engaging means comprising spaced pairs of spherical elements, and yieldable resilient tool biasing means opposed to said engaging means for maintaining the tool periphery in contact with said engaging means.

6. A machine tool comprising a frame, a work support carried by said frame, means supported by said frame for advancing a tool towards said work support, and means comprising spaced pairs of contacts carried by said frame intermediate said work support and said advancing means for engaging at least three peripheral points of said tool in substantially a single plane to maintain the work engaging portion of said tool in axial alignment, said tool engaging means including yieldable resilient tool biasing means.

7. A machine tool comprising a frame, a work support and a support for a tool carried by said frame, means for advancing said tool towards said work support, tool engaging means comprising spaced pairs of contacts carried by said frame intermediate said work support and said tool support for maintaining the work engaging portion of said tool in axial alignment, and yieldable resilient tool biasing means opposed to said engaging means for maintaining the tool periphery in contact with said engaging means.

8. A machine tool comprising a frame, a work support and a rotary spindle for a tool carried by said frame, means for advancing said spindle towards said work support, tool engaging means comprising spaced pairs of contacts carried by said frame intermediate said work support and said spindle for maintaining the work engaging portion of said tool in axial alignment, and yieldable resilient tool biasing means opposed to said engaging means for maintaining the tool periphery in contact with said engaging means.

9. A machine tool comprising a frame, a work support carried by said frame, means supported by said frame for advancing a tool towards said work support, peripheral driving means for rotating said tool, tool engaging means comprising spaced pairs of contacts carried by said frame intermediate said work support and said driving means for maintaining the work engaging portion of said tool in axial alignment, and yieldable resilient tool biasing means cooperating with said engaging means and rotating means.

10. A machine tool comprising a frame, a work support carried by said frame, means supported by said frame for advancing a tool towards said work support, yieldable peripheral driving means for rotating said tool, tool engaging means comprising spaced pairs of contacts carried by said frame intermediate said work support and said driving means for maintaining the work engaging portion of said tool in axial alignment, and yieldable resilient tool biasing means cooperating with said engaging means and rotating means.

11. A machine tool comprising a frame, a work support carried by said frame, a cam supported by said frame for advancing a tool towards said work support, tool engaging means comprising spaced pairs of contacts relatively fixed with respect to said frame intermediate said work support and said cam for maintaining the work engaging portion of said tool in axial alignment, and yieldable resilient tool biasing means opposed to said engaging means for maintaining the tool periphery in contact with said engaging means.

12. A machine tool comprising a frame, a work support carried by said frame, means for advancing a tool towards said work support, means for normally biasing said tool away from said work support, tool engaging means relatively fixed with respect to said frame intermediate said work support and said advancing means for maintaining the work engaging portion of said tool in axial alignment, and yieldable resilient tool biasing means opposed to said engaging means for maintaining the tool periphery in contact with said engaging means.

13. A machine tool comprising a frame, a work support and a plurality of radially disposed tool supports carried by said frame, and means for advancing a plurality of tools received by said tool supports towards said work support, said tool supports including tool engaging means comprising spaced pairs of contacts for each of said tools relatively fixed with respect to said frame intermediate said work support and said advancing means for maintaining the work engaging portion of each of said tools in axial alignment, and yieldable resilient tool biasing means opposed to said engaging means for maintaining the tool periphery in contact with said engaging means.

14. A machine tool comprising a frame, a work support and a plurality of radially disposed tool supports carried by said frame, means for advancing a plurality of tools received by said tool supports towards said work support, and means for rotating said tools, said tool supports including tool engaging means comprising spaced pairs of contacts for each of said tools relatively fixed with respect to said frame intermediate said work support and said advancing means for maintaining the work engaging portion of each of said tools in axial alignment, and yieldable resilient tool biasing means cooperating with said engaging means and rotating means.

15. A machine tool comprising a frame, a work support and tool supports carried by said frame, and means for advancing tools received by said tool supports towards said work support, said tool supports including tool engaging means comprising spaced pairs of contacts relatively fixed with respect to said frame adjacent said work support for maintaining the work engaging portion of each of said tools in axial alignment, and yieldable resilient tool biasing means opposed to said engaging means for maintaining the tool periphery in contact with said engaging means.

16. A machine tool comprising a frame, a work support and a plurality of radially disposed tool supports carried by said frame, and means for simultaneously advancing a plurality of tools received by said tool supports towards said work support, said tool supports including tool engaging means comprising spaced pairs of contacts relatively fixed with respect to said frame adjacent said work support for maintaining the work engaging portion of each of said tools in axial alignment, and yieldable resilient tool biasing means opposed to said engaging means for maintaining the tool periphery in contact with said engaging means.

17. A machine tool comprising a frame, a work support carried by said frame, means for advancing a plurality of tools towards said work support, tool periphery engaging means comprising spaced pairs of contacts secured to said frame adjacent said work support for maintaining the work engaging portion of each of said tools in axial alignment, and yieldable resilient tool biasing means opposed to said engaging means for maintaining the tool periphery in contact with said engaging means.

18. A machine tool comprising a frame, a work support carried by said frame, means for advancing a plurality of tools towards said work support, and a plurality of contact means secured to said frame adjacent said work support for engaging each tool peripherally at three substantially coplanar points to maintain the work engaging portion of each of said tools in axial alignment, said tool engaging means including yieldable resilient tool biasing means.

19. A machine tool comprising a frame, a work support carried by said frame, means for advancing a plurality of tools towards said work support, plural spaced notch-defining means secured to said frame adjacent said work support for peripherally engaging axially spaced portions of each tool to maintain the work engaging portion of each of said tools in axial alignment, and yieldable resilient tool biasing means opposed to said engaging means for maintaining the tool periphery in contact with said engaging means.

20. A machine tool comprising a frame, a work support carried by said frame, means for advancing a plurality of drills radially towards said work support, spaced pairs of spherical elements carried by said frame adjacent said work support for peripherally engaging said drills to maintain the work engaging portion of each of said drills in axial alignment, and yieldable resilient tool biasing means opposed to said engaging means for maintaining the tool periphery in contact with said engaging means.

21. A drilling machine comprising a frame, spaced pairs of notch forming surfaces defining open bearings carried by said frame, a tool driving member having integral circular peripheral portions received in contact with said bearings for rotation about its own axis, and frictional means directed at an acute angle to said axis in driving relationship with said member and biasing said member towards said bearings and in one direction along said axis.

22. The invention as set forth in claim 21 wherein said rotating means is resilient.

JOHN A. CUPLER, II.

REFERENCES CITED

The following references are of record in the file of this patent:

UNITED STATES PATENTS

| Number | Name | Date |
|---|---|---|
| 138,742 | Eisenmann | May 13, 1873 |
| 859,955 | Libby | July 16, 1907 |
| 1,320,208 | Curtis | Oct. 28, 1919 |

FOREIGN PATENTS

| Number | Country | Date |
|---|---|---|
| 431,267 | France | Sept. 6, 1911 |
| 431,880 | Great Britain | July 17, 1935 |